United States Patent [19]

Sato

[11] Patent Number: 5,017,773

[45] Date of Patent: May 21, 1991

[54] APPARATUS FOR DETECTING NUMBER OF PACKS INCLUDED IN BUNDLE

[75] Inventor: Masamichi Sato, Kawasaki, Japan

[73] Assignee: Kabushiki Kaisha Toshiba, Kawasaki, Japan

[21] Appl. No.: 453,837

[22] Filed: Dec. 20, 1989

[30] Foreign Application Priority Data

Dec. 22, 1988 [JP] Japan ................................ 63-322050

[51] Int. Cl.[5] ................................................ G01N 9/04

[52] U.S. Cl. ............................. 250/223 R; 250/222.2; 209/534

[58] Field of Search ................ 250/222.2, 223 R, 560, 250/561; 209/534, 536, 538

[56] References Cited

U.S. PATENT DOCUMENTS

| | | | |
|---|---|---|---|
| 4,188,544 | 2/1980 | Chasson | 250/223 R |
| 4,281,243 | 7/1981 | Hudler | 250/223 R |
| 4,483,124 | 11/1984 | Ohba et al. | 209/534 |
| 4,845,917 | 7/1989 | Omura et al. | 209/534 |
| 4,929,843 | 5/1990 | Chmielewski, Jr. et al. | 250/223 R |

*Primary Examiner*—David C. Nelms
*Assistant Examiner*—Stephone B. Allen
*Attorney, Agent, or Firm*—Cushman, Darby & Cushman

[57] ABSTRACT

A laser beam emitted from a semiconductor laser is radiated and scanned on a bundle of paper materials which is being conveyed, and the laser beam reflected by the bundle is received by a plurality of photocells to be converted to electrical signals. A signal synthesizer synthesizes the electrical signals output from the photocells. A binary circuit binarizes the synthesized signal to generate a boundary signal corresponding to a boundary between packs included in the bundle. A CPU detects the number of packs included in the bundle on the basis of the number of boundary signals.

14 Claims, 10 Drawing Sheets

FIG. 4A
FIG. 4B
FIG. 4C
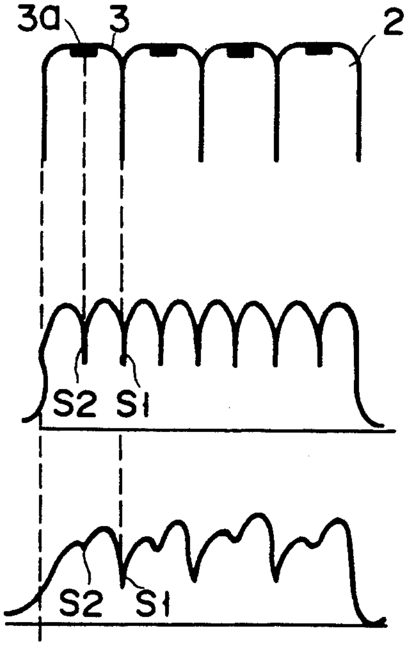
FIG. 5A
FIG. 5B
FIG. 5C
FIG. 5D
FIG. 5E
FIG. 5F
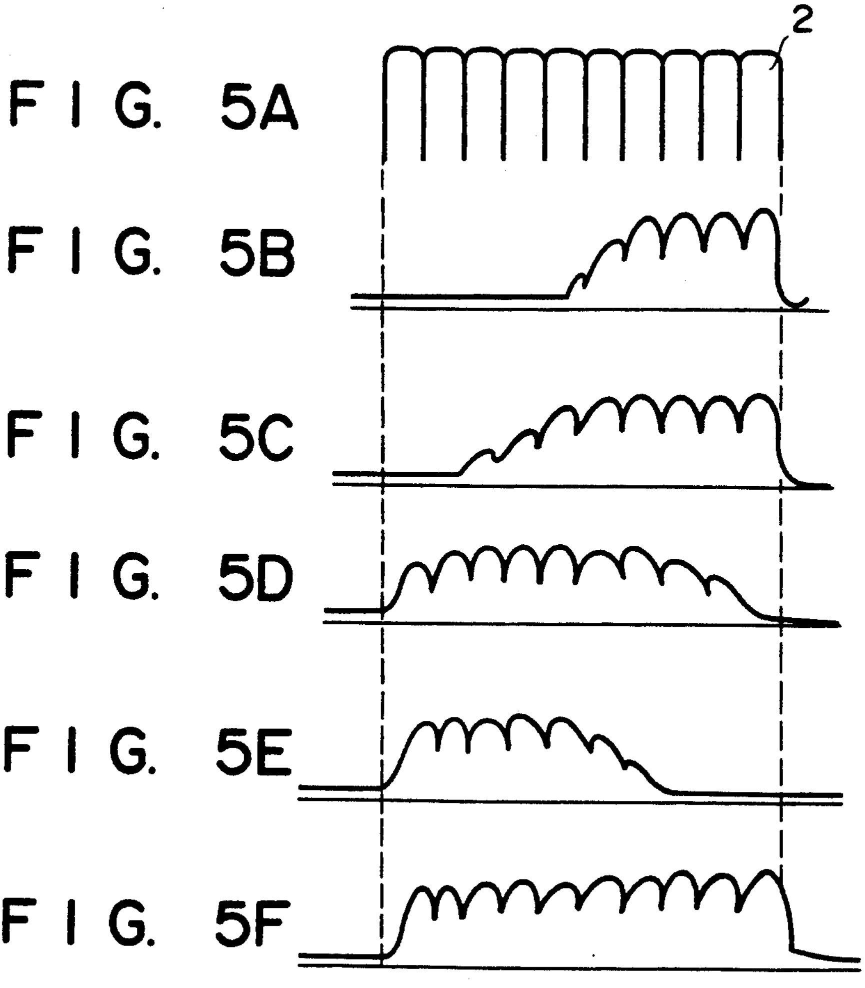

APPARATUS FOR DETECTING NUMBER OF PACKS INCLUDED IN BUNDLE

BACKGROUND OF THE INVENTION

1. Field of the Invention

The present invention relates to a bill counting apparatus used in, e.g., a banking organization and, more particularly, to a pack number detecting apparatus for detecting the number of packs of bills each of which is bound with a strip, and which are included in a bundle which is bound with bands to be conveyed.

2. Description of the Related Art

As an apparatus for counting bills, a pack count detecting apparatus for detecting a bundle of bills which is being conveyed to detect the number of packs included in the bundle is known. In this case, the "pack" is a predetermined number of bills (e.g., 100 bills) bound with a strip, and the "bundle" is, e.g., 10 packs bound with bands.

The pack number detecting apparatus employs a measuring method of detecting the number of packs included in a bundle in accordance with the weight of the bundle. More specifically, the weight of a bundle to be detected is measured, and it is checked whether or not the measured weight falls in a range between upper and lower limit values as comparison data of a weight prepared in units of types of bills. If the measured weight does not fall within the range, it is determined that the bundle does not include the predetermined number of packs.

However, when the number of packs is detected on the basis of a weight, the weight of bills may change under the influence of a foreign matter such as a tape adhered to a bill, a humidity upon measurement, and the like. For this reason, the measured weight of a bundle may erroneously fall outside a range between the upper and lower limit values of the weight, or may fall within the range although the weight does not actually reach a predetermined weight.

In this case, the upper and lower limit values of a weight must be set in accordance with the types of bills, resulting in a cumbersome setup operation. In order to measure a weight, a bundle which is being conveyed must be temporarily stopped, resulting in a limited processing speed.

SUMMARY OF THE INVENTION

It is an object of the present invention to provide a pack count detecting apparatus which can accurately detect the number of packs with a simple operation without being influenced by the weight of paper materials.

In order to achieve the above object, there is provided a pack number detecting apparatus for detecting the number of packs included in a bundle being prepared by binding a predetermined number of packs, and each pack being prepared by binding a predetermined number of sheets with a strip, comprising:

means for radiating light on the bundle;

means for scanning light reflected from the bundle;

means for converting light reflected from the bundle into an electrical signal;

first detection means for detecting deflection points corresponding to boundaries between adjacent packs included in the electrical signal which is converted light reflected from the strips of the bundle by said converting means; and second detection means for detecting the number of packs included in the bundle on the basis of the number of deflection points detected by said first detection means.

According to the present invention, light is radiated and scanned on a bundle of paper materials conveyed, and light reflected by the bundle is photo-electrically converted to generate a scan signal. A deflection point included in the scan signal is detected as a boundary signal corresponding to a boundary between two adjacent packs, thus detecting the number of packs. Therefore, the number of packs can be accurately detected with a simple operation without being influenced by the weight of paper materials.

BRIEF DESCRIPTION OF THE DRAWINGS

FIG. 4A is an illustration showing a bundle;

FIGS. 4B and 4C are waveform charts for explaining the detection principle of reflected light;

FIG. 5A is an illustration showing a bundle;

FIGS. 5B to 5F are waveform charts for explaining the detection principle of reflected light;

DETAILED DESCRIPTION OF THE PREFERRED EMBODIMENT

An embodiment of the present invention will now be described with reference to the accompanying drawings.

Figure 1A:
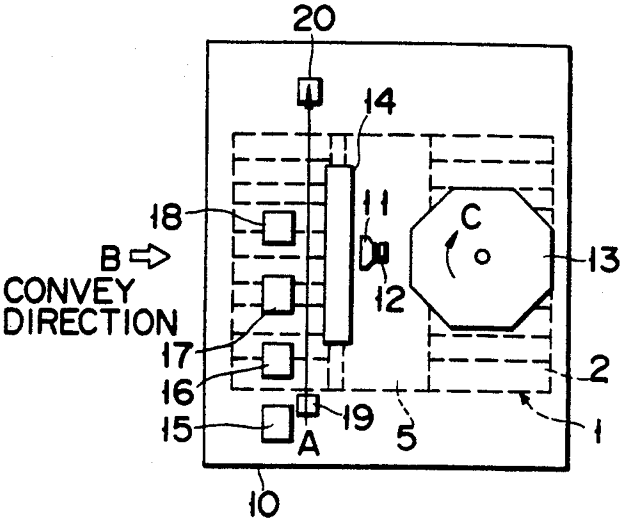
FIG. 1A is a plan view showing a schematic arrangement of an optical system.
Figure 1B:
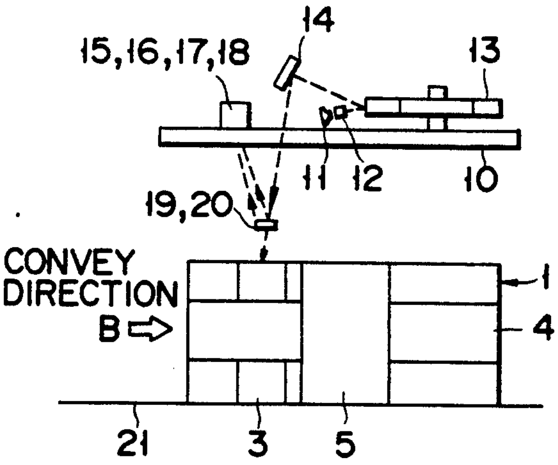
FIG. 1B is a front view of FIG. 1A.
Figure 1C:
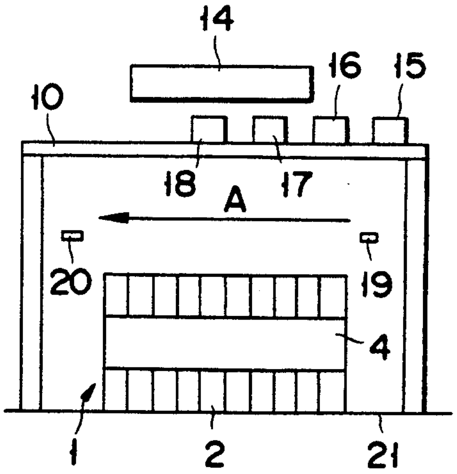
FIG. 1C is a side view of FIG. 1A.

FIGS. 1A, 1B, and 1C show a schematic arrangement of an optical system.

An optical system comprises a base 10, a semiconductor laser 11, a collimator lens 12, a regular octahedral mirror 13, a reflection mirror 14, photocells 15, 16, 17, and 18, and standard plates 19 and 20. A convey path 21 for conveying a bundle 1 placed thereon in a given direction is arranged below the base 10.

The base 10 is formed of a transparent member. The semiconductor laser (scanning means) 11 disposed on the base 10 generates a laser beam having, e.g., a near infrared wavelength of 780 nm. A laser beam emitted from the semiconductor laser 11 is radiated on a side surface portion of the regular polyhedral mirror 13, which is rotated in a direction of an arrow C in FIG. 1A at a constant speed, through the collimator lens 12. Light reflected by the regular polyhedral mirror 13 forms a scan beam which scans in a direction of an arrow A in FIG. 1C upon rotation of the regular polyhedral mirror 13. The scan beam scans the bundle 1 to be almost perpendicular to a convey direction B of the bundle 1 of bills. More specifically, the scan beam from the regular polyhedral mirror 13 is reflected by the stationary reflection mirror 14, and is radiated on the bundle 1 of bills conveyed below the base 10. The light emitted from the semiconductor laser 11 forms a focal point on the upper surface of the bundle 1 through the collimator lens 12.

A laser beam reflected and scattered by the bundle 1 is received by the four photocells 15 to 18. These photocells 15 to 18 are arranged on the base 10 along the scan direction of the scan beam, as shown in FIG. 1C. These photocells 15 to 18 are arranged obliquely above the bundle 1 conveyed on the convey path 21.

The standard plates 19 and 20 as reflection plates for reflecting the scan beam are arranged at a level slightly separated from the upper surface of the conveyed bundle 1. A distance between these standard plates 19 and 20 is set to be wider than the width of the bundle 1. The bundle 1 is conveyed between these standard plates 19 and 20. The standard plate 19 is used for detecting a read start timing of photoelectrical conversion signals output from the photocells 15 to 18. The standard plate 20 is used for, e.g., self diagnosis.

The convey path 21 is arranged below the optical system, and conveys the bundle 1 in the direction of the arrow B in FIG. 1A at a predetermined speed.

Note that the bundle 1 is bound with bands 4 and 5, and a pack 2 is bound with a strip 3.

Figure 2:
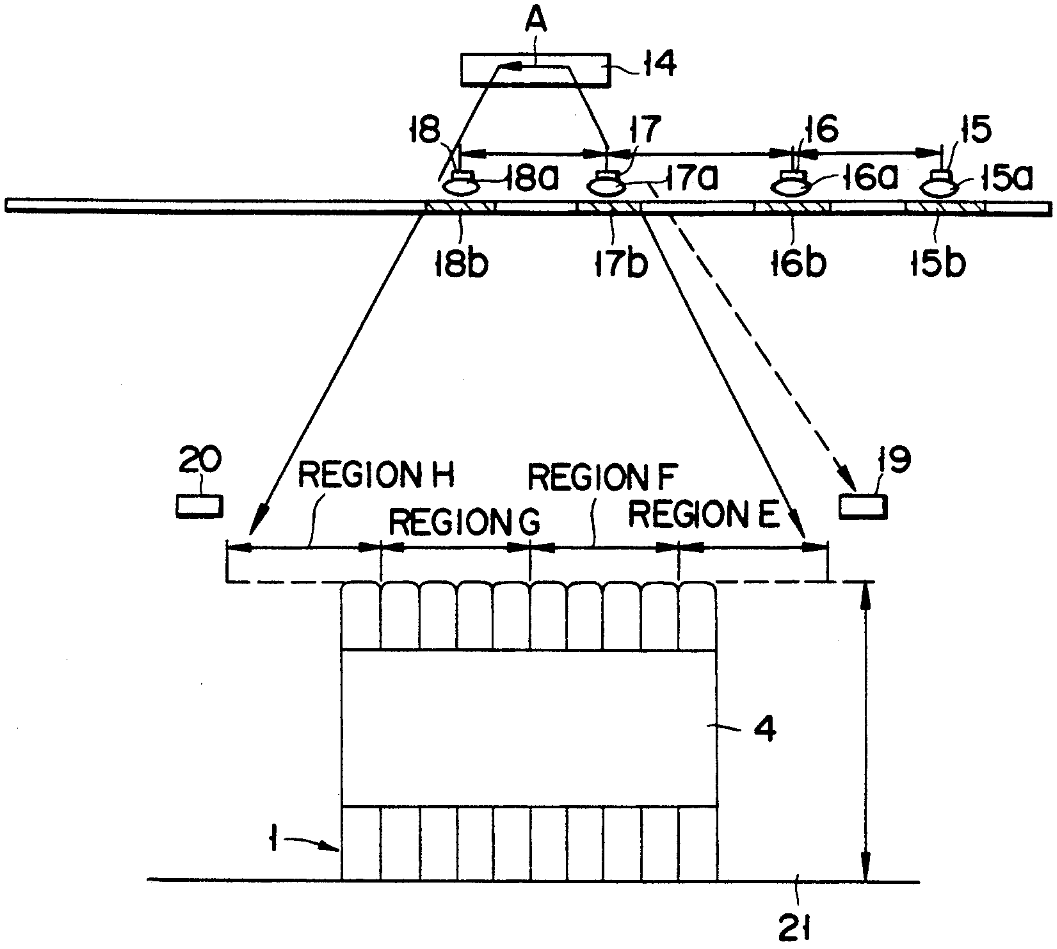
FIG. 2 is an illustration for explaining a detection field.

FIG. 2 shows the photocells 15 to 18. Filters 15A, 16A, 17A, and 18A for passing light components within a wavelength range of 700 to 1,200 nm are formed in portions of the base 10 facing the front surfaces of these photocells 15 to 18. Focusing lenses 15B, 16B, 17B, and 18B are arranged between these photocells 15 to 18 and the filters 15A to 18A. The four photocells 15 to 18 output electrical signals (scan signals) according to the intensities of light components received through the filters 15A to 18A and the focusing lenses 15B to 18B.

The photocells 15 to 18 respectively have predetermined detection regions. The photocells 15 to 18 respectively detect reflected light from regions E, F, G, and H, and photoelectrically convert the detected light. The plurality of regions E to H are determined in this manner, and light components from the regions E to H are respectively detected by the plurality of photocells 15 to 18 arranged obliquely above these regions E to H, so that a boundary between two adjacent packs 2 can be accurately detected without being influenced by characters or patterns drawn on the strips 3, as will be described later.

Figure 3:
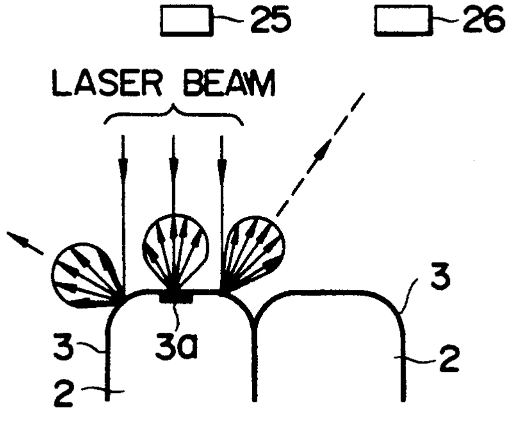
FIG. 3 is an illustration for explaining a detection principle of reflected light.

The detection principle of the boundary between the packs 2 will be described below with reference to FIGS. 3 to 4C.

The pack 2 is detected by radiating a laser beam on the strip 3 around the pack 2 and photoelectrically converting the reflected light to detect a signal (boundary signal) corresponding to a dark portion formed between the two adjacent packs 2. In this case, the pack 2 can be detected while eliminating the influence of characters or patterns stamped on the strip 3.

FIG. 4B shows a waveform when reflected light of a laser beam radiated on the strip 3 is received by a light-receiving element 25 arranged immediately above the strip 3. In this case, a signal S1 based on a dark portion formed between the two packs 2, and a signal S2 which corresponds to a portion with a decreased reflectivity since the laser beam is absorbed by characters or patterns 3*a* stamped on the strip 3, appear. The signals S1 and S2 cannot be distinguished from each other.

In contrast to this, FIG. 4C shows a waveform when reflected light of a laser beam radiated on the strip 3 is received by a light-receiving element 26 arranged obliquely above the strip 3. In this case, since the signal S2 corresponding to reflected light from the characters or patterns 3*a* stamped on the strip 3 is considerably weakened, the signal S1 corresponding to the dark portion formed at a boundary between the two packs 2 clearly appears. Therefore, the signals S1 and S2 can be satisfactorily distinguished from each other.

For this reason, as shown in FIGS. 1A to 2, the photocells 15 to 18 are arranged obliquely above the regions E to H to be detected, and a plurality of detection regions and photocells are disposed. The influence of patterns in a visible region can be eliminated by the wavelength ranges of the laser beam and the filters 15A to 18A.

FIGS. 5B to 5E show output waveforms from the photocells 15 to 18 corresponding to reflected light from the packs 2 shown in FIG. 5A. The signals are synthesized by a signal synthesizer 30 (to be described later) to form a single scan signal. More specifically, light reflected by the standard plate 19 arranged below the photocell 15 is received by the photocell 15 and is converted to an electrical signal. Signals from the photocells 16, 17, and 18 are synthesized using the electrical signal from the photocell 15 as a trigger signal, thus obtaining a synthesized signal including a boundary signal, as shown in FIG. 5F.

Figure 6:
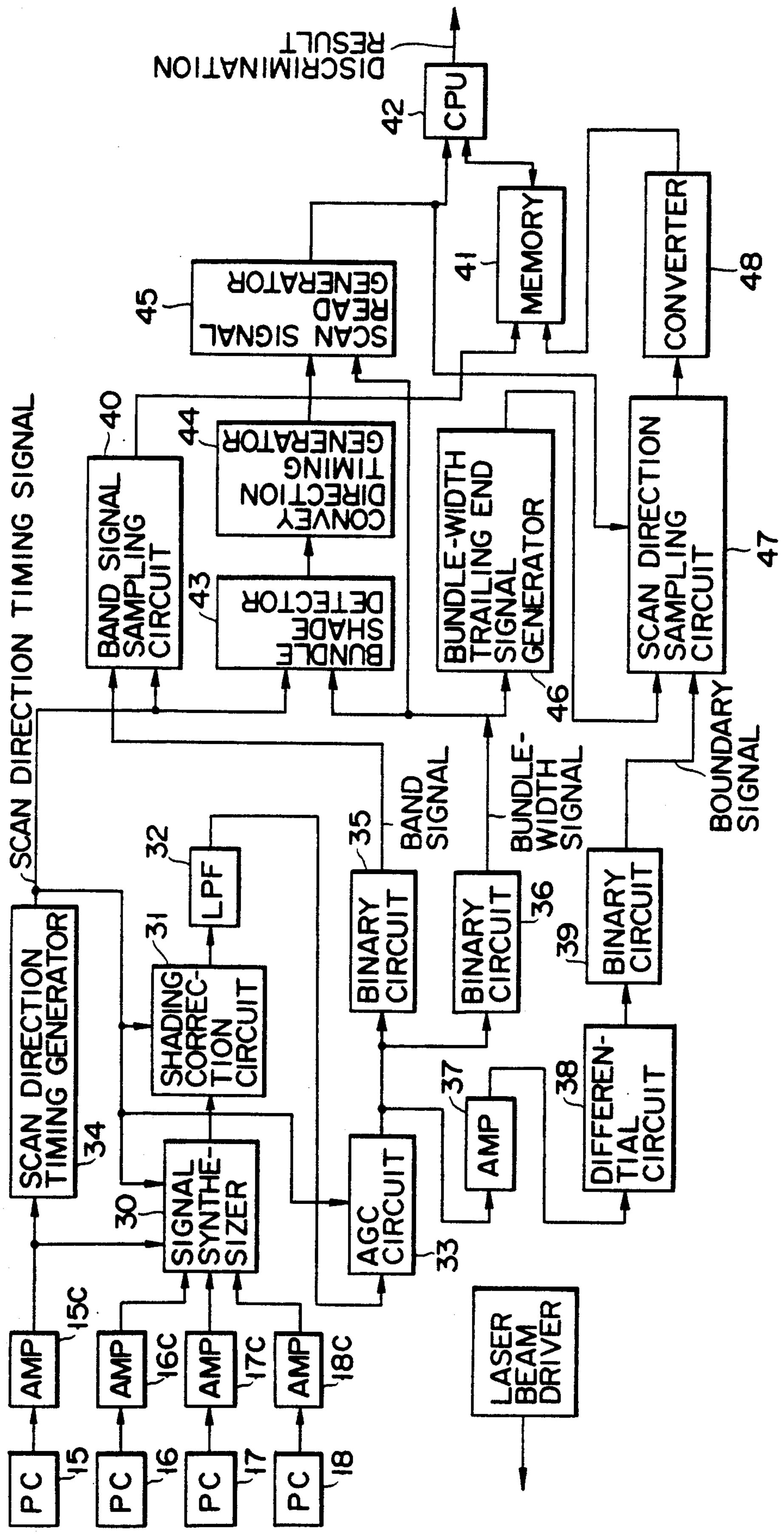
FIG. 6 is a block diagram of an electrical circuit.

FIG. 6 is a block diagram of an electrical circuit according to this embodiment.

The photocells (PCs) 15, 16, 17, and 18 are respectively connected to amplifiers (AMPs) 15C, 16C, 17C, and 18C. The output signals from the PCs 15 to 18 are respectively amplified by the AMPs 15C to 18C. The AMP 15C is connected to a scan direction timing generator 34. A signal from the photocell 15 detecting the standard plate 19 is amplified by the AMP 15C, and is then supplied to the scan direction timing generator 34. The scan direction timing generator 34 generates a scan direction timing signal in accordance with the signal supplied from the AMP 15C, and supplies this signal to respective sections in FIG. 6.

The signal synthesizer 30 is connected to the AMPs 15C to 18C. The signal synthesizer 30 synthesizes the signals from the AMPs 15C to 18C in accordance with the scan direction timing signal supplied from the scan direction timing generator 34 to generate a synthesized signal shown in FIG. 5F.

A shading correction circuit 31 is connected to the signal synthesizer 30. The shading correction circuit 31 removes a distortion produced near boundaries of signals on the basis of distances from the detection positions of the photocells 15 to 18. A low-pass filter (LPF) 32 is connected to the shading correction circuit 31. The LPF 32 removes a high-frequency component from the signal output from the shading correction circuit 31.

An AGC circuit 33 is connected to the LPF 32. The AGC circuit 33 corrects a gain of a signal in proportion to a change in amount of light reflected by the standard plate 19 in order to eliminate the adverse influence caused by a decrease in amount of a laser beam.

Binary circuits 35 and 36 are connected to the AGC circuit 33. The binary circuit 35 binaries the signal supplied from the AGC circuit 33, and generates a band signal corresponding to the band 5. The binary circuit 36 binarizes the signal supplied from the AGC circuit 33 to generate a bundle-width signal corresponding to the width of the bundle.

A differential circuit 38 is connected to the AGC circuit 33 through an AMP 37. A binary circuit 39 is connected to the differential circuit 38. The binary circuit 39 binarizes a signal differentiated by the differential circuit 38 to generate a boundary signal corresponding to a boundary between adjacent packs.

Each of the binary circuits 35, 36, and 39 compares a voltage of a predetermined level (slice voltage) and an input voltage, and outputs a "1" signal when the input voltage is higher than the slice voltage.

Figure 7A:
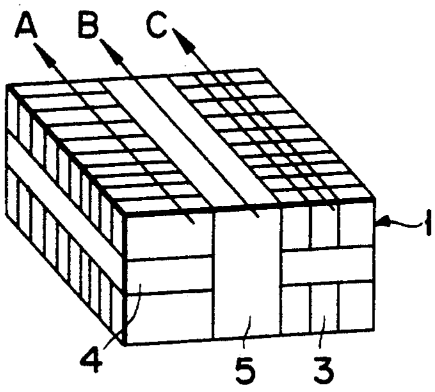
FIG. 7A is an illustration for explaining a detection operation of a bundle.
Figure 7B:
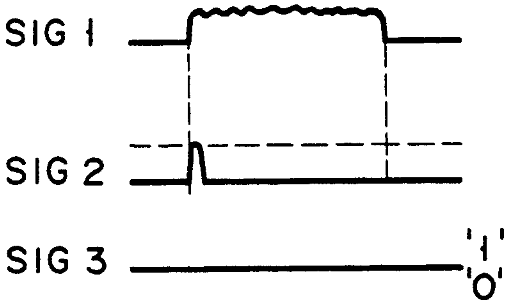
FIGS. 7B to 7D are waveform charts for explaining the operation of the electrical circuit shown in FIG. 6.
Figure 7C:
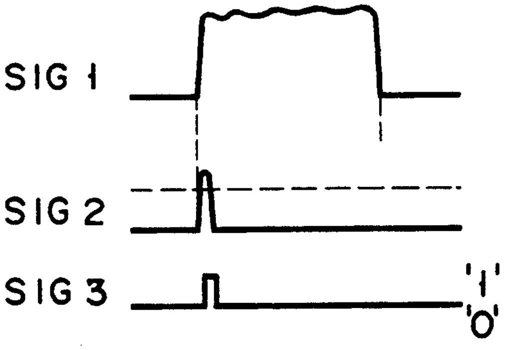
Figure 7D:
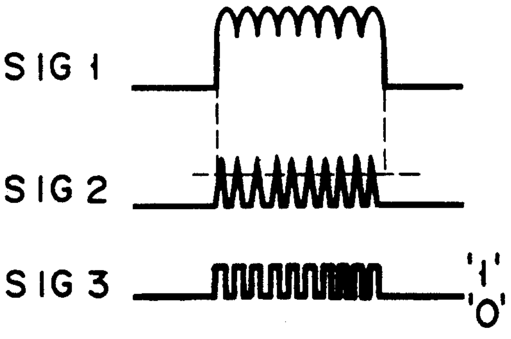

FIGS. 7B to 7D show signals output from the binary circuit 39.

FIG. 7B shows signals are respective sections obtained when a scan operation A shown in FIG. 7A is performed, i.e., when a portion with neither the strip 3 nor the band 5 is scanned. When the differential circuit 38 receives a synthesized signal SIG1 output from the signal synthesizer 30 through the shading correction circuit 31, the LPF 32, the AGC circuit 33, and the AMP 37, it outputs a differential signal SIG2 in response to the leading edge of the synthesized signal SIG1. When the binary circuit 39 receives the differential signal SIG2 from the differential circuit 38, it slices and binarizes the differential signal SIG2 with the predetermined slice voltage to output a boundary signal SIG3.

FIG. 7C shows signals at respective sections obtained when a scan operation B shown in FIG. 7A is performed, i.e., when the band 5 is scanned. When the differential circuit 38 receives the synthesized signal SIG1 output from the signal synthesizer 30 via the above-mentioned circuits, it outputs the differential signal SIG2 in response to the leading edge of the synthesized signal SIG1. In this case, since the amount of light reflected by the band 5 is large, the high-level signals SIG1 and SIG2 are obtained. When the binary circuit 39 receives the differential signal SIG2 from the differential circuit 38, it slices and binarizes the differential signal SIG2 with the predetermined slice voltage to output the boundary signal SIG3.

FIG. 7D shows signals at respective sections obtained when a scan operation C shown in FIG. 7A is performed, i.e., when the strip 3 is scanned. When the differential circuit 38 receives the synthesized signal SIG1 output from the signal synthesizer 30 via the above-mentioned circuits, it outputs the differential signals SIG2 in response to the leading edge of the synthesized signal SIG1. The differential signals SIG2 are output by the number of pulses corresponding to boundaries of the packs 2. When the differential signals SIG2 are supplied to the binary circuit 39, the circuit 39 outputs the boundary signals SIG3. The boundary signals SIG3 shown in FIG. 7D are used as signals for counting the packs 2.

Figure 8A:
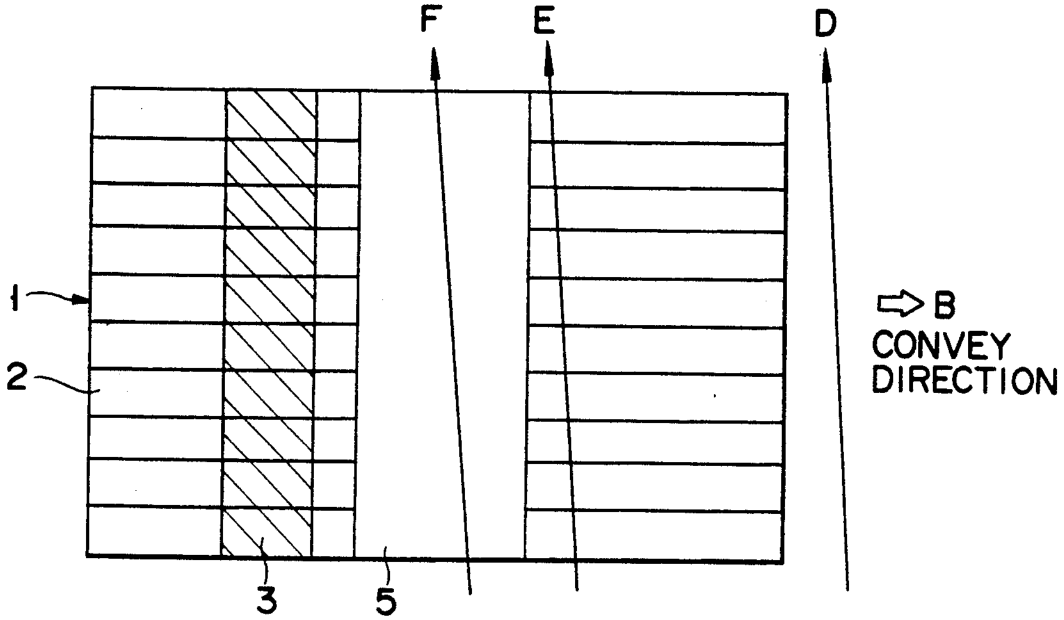
FIG. 8A is an illustration for explaining the detection operation of a bundle.
Figure 8B:
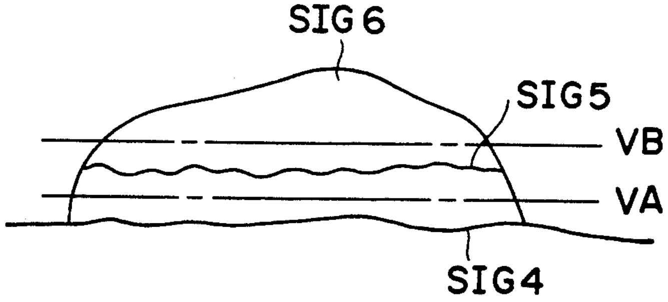
FIG. 8B is a waveform chart for explaining the operation of the electrical circuit.

FIG. 8B shows the band signal and the bundle-width signal obtained from the binary circuits 35 and 36.

A signal SIG4 shown in FIG. 8B is a synthesized signal output from the signal synthesizer 30 when a scan operation D shown in FIG. 8A is performed, i.e., when the convey path 21 portion is scanned. The synthesized signal SIG4 is supplied to the binary circuits 35 and 36 via the shading correction circuit 31, the LPF 23, and the AGC circuit 33. However, since the synthesized signal SIG4 reaches neither a slice voltage VA for detecting the width of the bundle nor a slice voltage VB for detecting the band, the binary circuits 35 and 36 do not output the "1" signals.

When a scan operation E shown in FIG. 8A is performed, i.e., when the upper portion of the bundle 1 without the band is scanned, a synthesized signal SIG5 output from the signal synthesizer 30 is supplied to the binary circuits 35 and 36 via the shading correction circuit 31, the LPF 23, and the AGC circuit 33. Since the synthesized signal SIG5 has a level higher than the signal that obtained in the scan operation D, it does not reach the slice voltage VB for detecting the band but reaches the slice voltage VA for detecting the width of the bundle. Therefore, the binary circuit 35 does not output the "1" signal but the binary circuit 36 outputs a binary signal (not shown) including a "1" signal corresponding to a voltage portion exceeding the slice voltage VA.

When a scan operation F shown in FIG. 8A is performed, i.e., when a portion of the band 5 is scanned, a synthesized signal SIG6 output from the signal synthesizer 30 is similarly supplied to the binary circuits 35 and 36 via the shading correction circuit 31, the LPF 23, and the AGC circuit 33. In this case, since a white band portion is scanned, an amount of reflected light is large, and the synthesized signal SIG6 has a level higher than the signals obtained in the scan operations D and E. Therefore, since the signal SIG6 exceeds the slice voltage VA for detecting the width of the bundle and the slice voltage VB for detecting the band, the binary circuits 35 and 36 output binary signals (not shown) including "1" signals corresponding to voltage portions exceeding the slice voltages VA and VB, respectively.

The input terminals of a band signal sampling circuit 40 shown in FIG. 6 are connected to the binary circuit 35 and the scan direction timing generator 34, and its output terminal is connected to a memory 41. The band signal sampling circuit 40 samples the band signal output from the binary circuit 35 in response to the scan direction timing signal supplied from the scan direction timing generator 34, and causes the memory 41 to store the sampled band signal. The memory 41 is connected to a CPU 42, and can be accessed under the control of the CPU 42.

The input terminals of a band shade detector 43 are connected to the binary circuit 36 and the scan direction timing generator 34, and its output terminal is connected to a convey direction timing generator 44. The convey direction timing generator 44 is connected to a scan signal read generator 45 for defining a read range of the scan signal. One input terminal of the scan signal read generator 45 is connected to the binary circuit 36, and its output terminal is connected to the CPU 42. The input terminal of a bundle-width trailing end signal generator 46 is connected to the binary circuit 36. The output terminal of the bundle-width trailing end signal generator 46 is connected to one input terminal of a scan direction sampling circuit 47. Other input terminal of a scan direction sampling circuit 47 are connected to the output terminals of the binary circuit 39 and the scan signal read generator 45. The output terminal of the scan direction sampling circuit 47 is connected to the memory 41 through a converter 48 for converting sampling data into byte data.

The bundle-width signal output from the binary circuit 36 is supplied to the bundle shade detector 43, the scan signal read generator 45, and the bundle-width trailing end signal generator 46. When the bundle shade detector 43 receives the bundle-width signal, it supplies to the convey direction timing generator 44 a signal indicating that the bundle 1 is conveyed. The convey direction timing generator 44 generates a timing signal associated with the convey direction in correspondence with the signal supplied from the bundle shade detector 43, and supplies it to the scan signal read generator 45. A read signal generated by the scan signal read generator 45 is supplied to the CPU 42 and the scan direction sampling circuit 47 to define the read range of the scan signal.

The bundle-width trailing end signal generator 46 detects a trailing edge (corresponding to the trailing end of the bundle) of the bundle-width signal output from the binary circuit 36, and generates the trailing end signal. The generator 46 supplies the trailing end signal to the scan direction sampling circuit 47. The scan direction sampling circuit 47 samples the boundary signal supplied from the binary circuit 39 while the read signal is being output from the scan signal read generator 45, and supplies the sampling data to the converter 48. In this case, the circuit 47 also samples the trailing end signal output from the bundle-width trailing end signal generator 46. The converter 48 converts the sampling data received from the scan direction sampling circuit 47 into byte data, and sequentially stores it in the memory 41. The sampling data are obtained in correspondence with scan operations, and are sequentially stored in the memory 41.

Figure 10A:
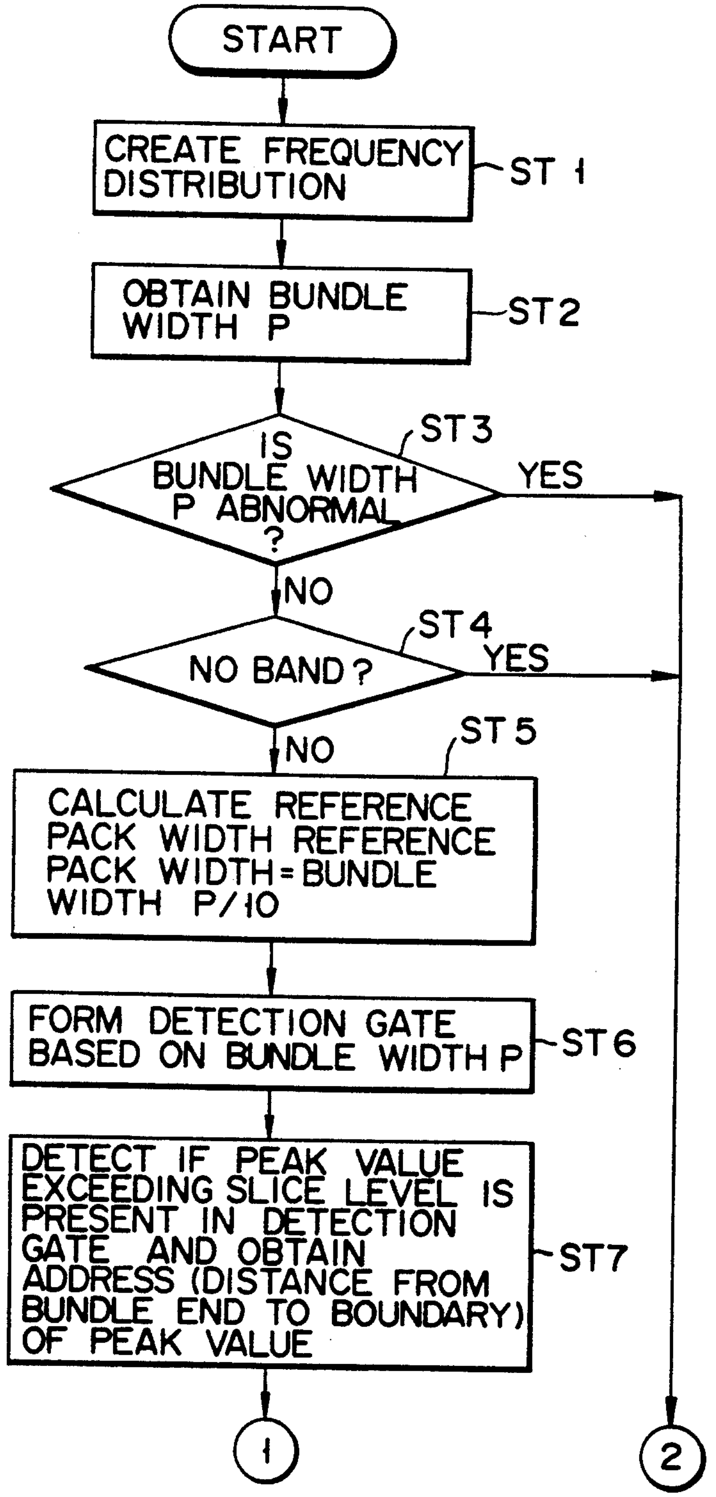
FIGS. 10A and 10B are flow charts for explaining the operation.
Figure 10B:
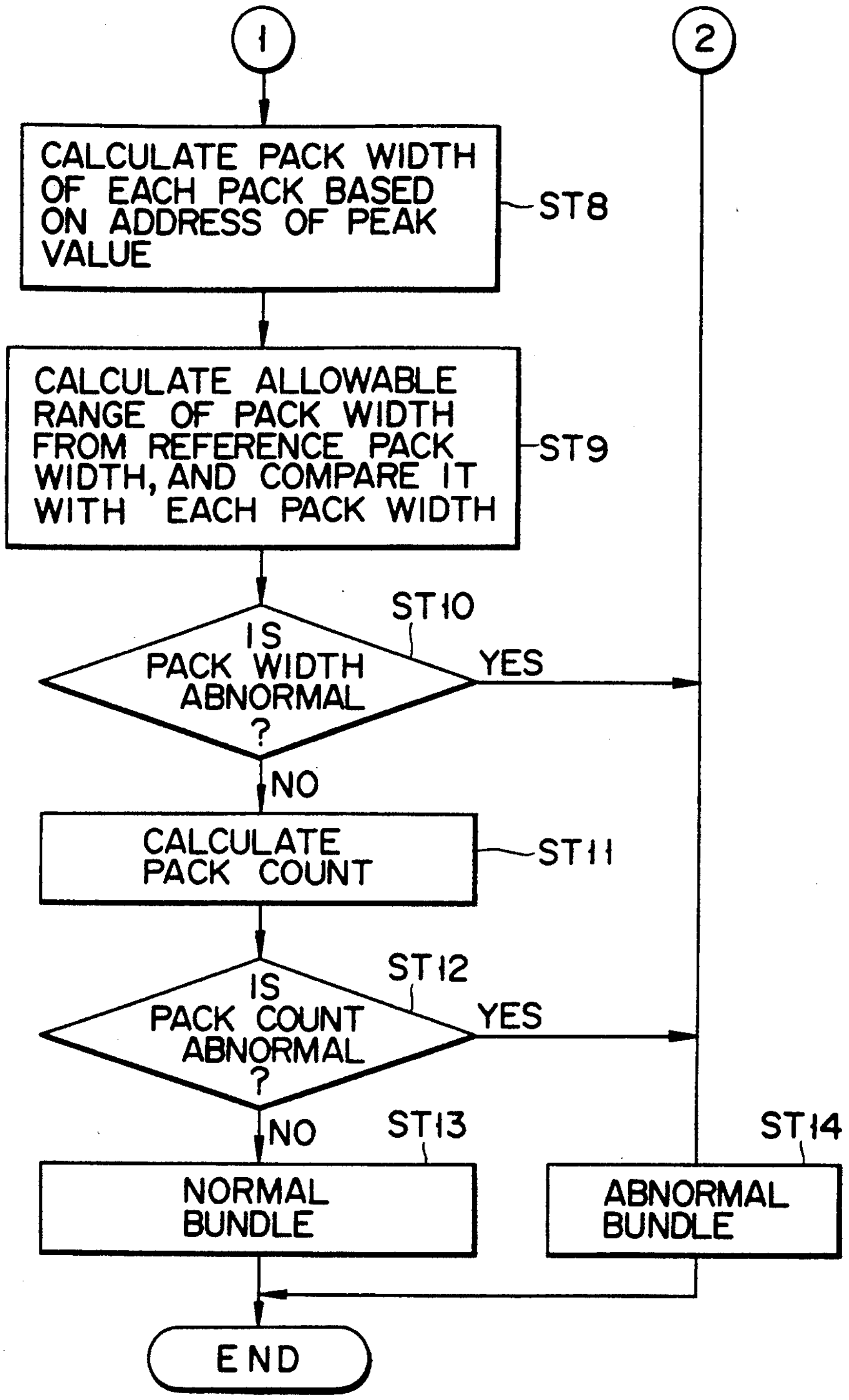

A discrimination operation in the above arrangement will be described below with reference to FIGS. 10A and 10B.

Figure 9A:
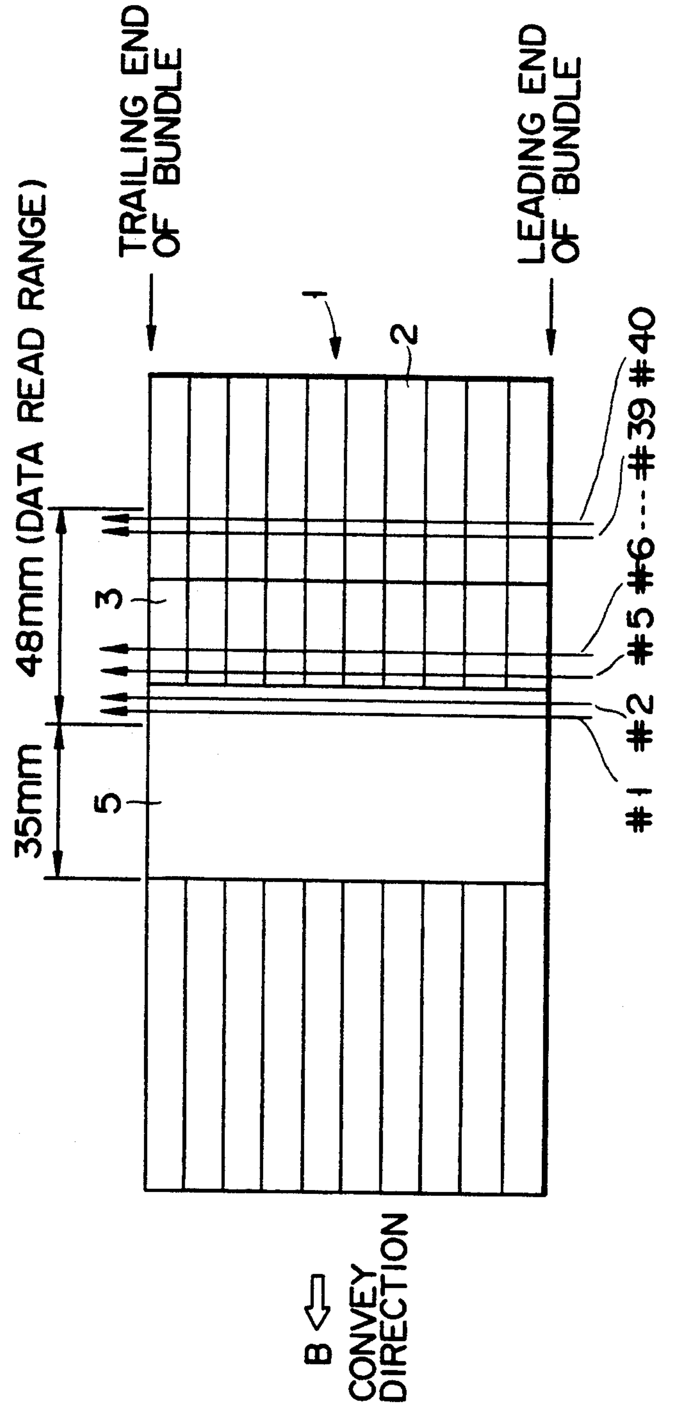
FIG. 9A is an illustration for explaining an operation of boundary detection processing.
Figure 9B:
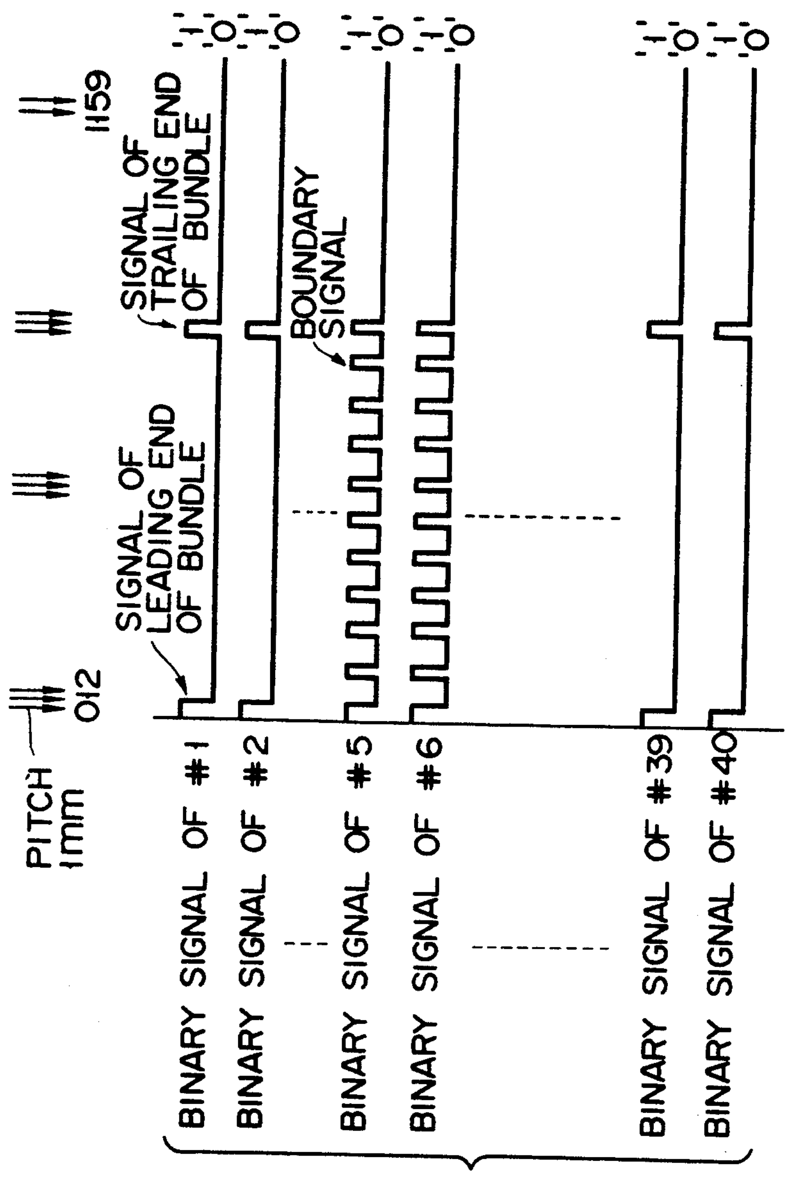
FIG. 9B is a waveform chart for explaining the operation of boundary detection processing.

In this embodiment, a case will be described wherein 40 scan operations are performed within a 48-mm data read range, as shown in FIG. 9A, and 160 data from 0 to 159 are sampled at 1-mm intervals for each scan operation, as shown in FIG. 9B.

Figure 9C:
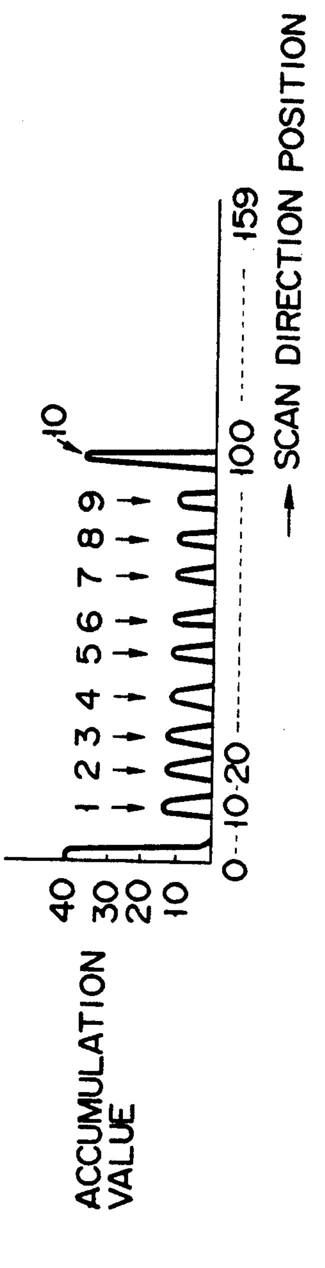
FIG. 9C is a histogram for explaining the operation of boundary detection processing.

The CPU 42 creates a frequency distribution as a total of "1" data, i.e., the boundary signals for the scan direction with reference to the leading end of the bundle 1 on the basis of data stored in the memory 41 (step ST1). More specifically, the CPU 42 sets 160 areas having addresses 0 to 159 in the memory 41. By the above-mentioned operation, the CPU 42 sequentially reads out data of the first scan signal, and checks if each readout data is "1". If the data is "1", the CPU 42 adds "1" to an area designated by an address corresponding to its sampling position. Similarly, the CPU 42 sequentially reads out data of the second scan signal, and checks if each readout data is "1". If the readout data is "1", the CPU 42 adds "1" to an area designated by an address corresponding to its sampling position. The CPU 42 executes the above-mentioned operation for 40 scan signals to obtain the frequency distribution of the boundary signals, as shown in FIG. 9C.

The CPU 42 obtains the width of the bundle on the basis of the frequency distribution (step ST2). More specifically, as shown in FIG. 9B, since signals corresponding to the leading and trailing ends of the bundle 1 are always detected in each scan operation, the width of the bundle can be calculated as a value between peaks of accumulation values. Therefore, under the condition that the peak value is larger than a predetermined accumulation value, a scan direction position having a maximum accumulation value, i.e., a sampling position is obtained, and the position is determined as a bundle width P.

The obtained bundle width P is compared with a value preset as an allowable value of the width of the bundle. If the bundle width P falls outside the allowable value, the flow jumps to step ST14, and the detected bundle is determined as an abnormal bundle. An exclusion signal is then output as a discrimination result, and the processing ends (step ST3).

If it is determined in step ST3 that the bundle width P falls within the allowable value, it is checked if the band 5 is wound (step ST4). More specifically, data stored in the memory 41 and obtained by sampling the band signal by the band signal sampling circuit 40 in correspondence with the scan operation of the band are read out and counted, and it is checked if the count value is equal to or larger than a preset value. If the count value is smaller than the preset value, the flow jumps to step ST14, and the detected bundle is determined as an abnormal bundle without a band. An exclusion signal is then output as a discrimination result, and the processing ends.

If it is determined in step ST4 that the band is wound, a reference pack width is calculated (step ST5). The reference pack width is obtained by dividing the bundle width P obtained in step ST2 with the number of packs to be included in the bundle 1, e.g., 10.

A boundary detection gate S is then formed on the basis of the bundle width P obtained in step ST2 (step ST6). The boundary detection gate S is data representing a range within which boundary signals should appear, and is formed according to the following formula:

$$R \times N - T \leqq S \leqq R \times N + T$$

where N is the number of packs, an arbitrary value of N=1, . . . Q being able to be selected, R is a value obtained by dividing the bundle width P with the number of packs Q to be detected, and T is an arbitrary value for defining an allowance.

Addresses of the boundary signals whose peak value exceeds the predetermined accumulation value, i.e., the scan direction positions, are obtained within the formed boundary detection gate S (step ST7). The width of each pack is obtained by the addresses of the peak values (step ST8). Thereafter, an allowable value of a pack width is calculated on the basis of the reference pack width obtained in step ST5 (step ST9), and it checked if each pack width obtained in step ST8 falls in the range of the allowable value, thus checking whether or not each pack width is abnormal (step ST10). More specifically, it is checked whether or not each pack width falls within the range given by the following formula:

$$R - U \leqq \text{pack width} \leqq R + U$$

where U is allowable values of the pack width, and is arbitrarily set. If the pack width falls outside the allowable range, the flow jumps to step ST14, and the detected bundle is determined as an abnormal bundle. An exclusion signal is then output as a discrimination result, and the processing ends.

If each pack width falls within the allowable range, the number of packs within the bundle width is counted (step ST11), and it is checked if the number of packs coincides with a preset value (step ST12). If these values do not coincide with each other, the flow jumps to step ST14, and the detected bundle is determined as an abnormal bundle. An exclusion signal is then output as a discrimination result, and the processing ends. However, if the number of packs coincides with the preset value, the flow advances to step ST13, and the detected bundle is determined as a normal bundle. A normal signal is then output as a discrimination result, and the processing ends.

According to the above embodiment, a laser beam is radiated and scanned on the bundle 1 of bills which is being conveyed, and the laser beam reflected by the bundle 1 is photoelectrically converted. The scan signals including boundary signals of the packs 2 constituting the bundle 1, the band signals, and the bundle-width signal are stored in the memory 41. The number of packs is detected on the basis of the signals stored in the memory 41. Therefore, the number of packs can be accurately detected without being influenced by the weight of bills unlike in the conventional apparatus. In addition, comparison data according to the types of bills need not be set, resulting in a simple operation.

Since the number of packs is optically detected by a laser beam, the bundle 1 need not be stopped upon measurement unlike in the conventional apparatus which measures a weight. Therefore, a detection operation can be performed at higher speed than in the conventional apparatus.

According to the above embodiment, abnormality of a bundle width, the presence/absence of a band, abnormality of a pack width, and the like can be detected as well as the number of packs. Therefore, the bundle and packs can be checked for many items, thus providing practical advantages.

In the above embodiment, paper materials subjected to pack count detection are bills. However, the present invention is not limited to this. For example, the present invention may be applied to securities other than bills, postal matters, and the like.

What is claimed is:

1. A pack number detecting apparatus for detecting the number of packs included in a bundle being prepared by binding a predetermined number of packs, and each pack being prepared by binding a predetermined number of sheets with a strip, comprising:
 - means for radiating light on the bundle;
 - means for scanning light reflected from the bundle;
 - means for converting light reflected from the bundle into an electrical signal;
 - first binary detection means for detecting deflection points corresponding to boundaries between adjacent packs included in the electrical signal which is converted light reflected from the strips of the bundle by said converting means and for binarizing a signal indicative thereof; and
 - second detection means for detecting the number of packs included in the bundle on the basis of the number of deflection points detected by said first binary detection means.

2. An apparatus according to claim 1, further comprising: means for conveying the bundle.

3. An apparatus according to claim 1, wherein said converting means comprises:
 - a plurality of photocell means, arranged obliquely above the bundle, for converting light reflected by the bundle into electrical signals.

4. An apparatus according to claim 1, wherein said second detection means comprises means for counting the number of boundaries detected by said first detection means.

5. An apparatus according to claim 1, wherein said scanning means comprises:
 - means for emitting a laser beam; and
 - means for reflecting the laser beam emitted from said emitting means to the bundle as a scan beam for scanning the bundle in a given direction.

6. An apparatus according to claim 5, wherein said emitting means comprises means for emitting a infrared laser beam.

7. A pack number detecting apparatus for detecting the number of packs included in a bundle being prepared by binding a predetermined number of packs, and each pack being prepared by binding a predetermined number of sheets with a strip, comprising:
 - means for radiating light on the bundle;
 - means for scanning light reflected from the bundle;
 - means for converting light reflected from the bundle into an electrical signal;
 - first detection means for detecting deflection points corresponding to boundaries between adjacent packs included in the electrical signal which is converted light reflected from the strips of the bundle by said converting means;
 - second detection means for detecting the number of packs included in the bundle on the basis of the number of deflection points detected by said first detection means;
 - means for sampling signals corresponding to the boundaries detected by said first detection means of predetermined intervals; and
 - means for storing the signals sampled by said sampling means.

8. A pack number detecting apparatus for detecting the number of packs included in a bundle being prepared by binding a predetermined number of packs, and each pach being prepared by binding a predetermined number of paper materials with a strip, comprising:
 - means for radiating light on the bundle;
 - means for scanning light reflected from the bundle;
 - a plurality of converting means for converting light reflected by the bundle into electrical signals;
 - means for synthesizing the electrical signals output from said plurality of converting means; and
 - means for binarizing a signal supplied from said synthesizing means and including deflection points corresponding to boundaries between packs.

9. An apparatus according to claim 8, further comprising:
 - means for conveying the bundle.

10. An apparatus according to claim 8, wherein said scanning means comprises:
 - means for emitting a laser beam; and
 - reflection means for reflecting the laser beam emitted from said emitting means to the bundle as a scan beam for scanning the bundle in a given direction.

11. An appartus according to claim 8, wherein said plurality of converting means are arranged obliquely above the bundle.

12. An apparatus according to claim 8, wherein said binary means includes means for differentiating a signal supplied from said synthesizing means.

13. An apparatus according to claim 8, further comprising:

means for sampling signals corresponding to the boundaries detected by said first detection means at predetermined intervals; and means for storing the signals sampled by said sampling means.

14. A pack number detecting method for detecting the number of packs included in a bundle being prepared by binding a predetermined number of packs, and each pack being prepared by binding a predetermined number of sheets with a strip, comprising the steps of:

optically scanning the bundle at a plurality of times to generate signals in correspondence with the scan operations;

obtaining deflection points corresponding to boundaries between packs on the basis of the generated signals;

sampling data of the deflection points at positions separated at predetermined intervals;

obtaining a frequency distribution of the sampling data in units of the sampling positions;

obtaining a bundle width on the basis of a distance between maximum values of the obtained frequency distribution;

obtaining a distance between boundary data exceeding a predetermined frequency of the obtained frequency distribution; and counting the number of distances between the boundary data when the obtained distance is almost equal to a value calculated by dividing the bundle width with a predetermined value.

* * * * *